E. MAZZA.
APPARATUS FOR SEPARATING THE CONSTITUENT ELEMENTS OF GASEOUS MIXTURES.
APPLICATION FILED APR. 18, 1906.
940,885.
Patented Nov. 23, 1909.
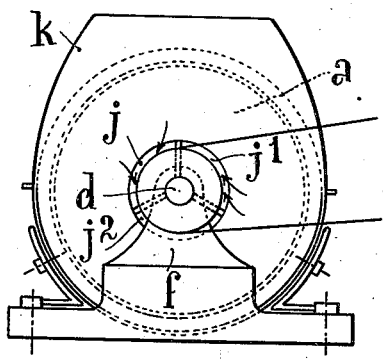
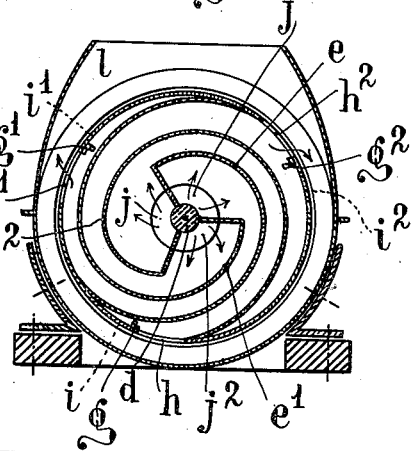
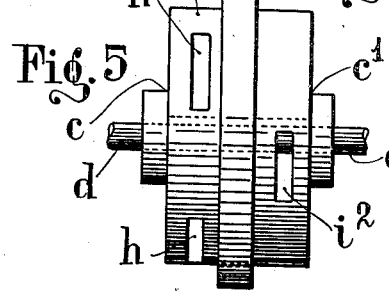
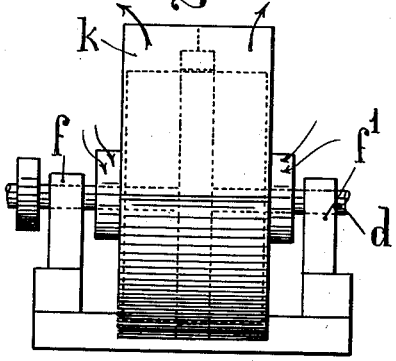
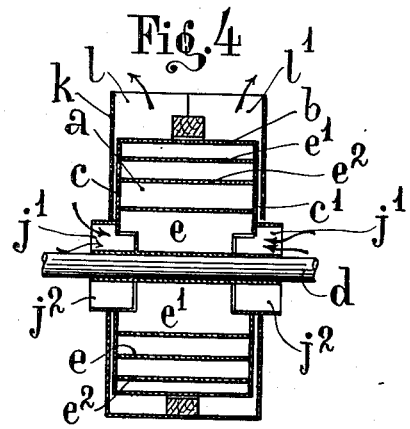
Witnesses.
Jesse N. Sutton.
M. J. Ellis.
Inventor.
Edoardo Mazza
by Henry Orth Jr.
Atty.

UNITED STATES PATENT OFFICE.

EDOARDO MAZZA, OF TURIN, ITALY.

APPARATUS FOR SEPARATING THE CONSTITUENT ELEMENTS OF GASEOUS MIXTURES.

940,885.  Specification of Letters Patent.  Patented Nov. 23, 1909.

Application filed April 18, 1906. Serial No. 312,505.

*To all whom it may concern:*

Be it known that I, EDOARDO MAZZA, a subject of the King of Italy, residing at Turin, in the Kingdom of Italy, have invented certain new and useful Improvements in Apparatus for Separating the Constituent Elements of Gaseous Mixtures; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

Experience has shown that if rotary movement be imparted to a mixture of gases of different densities, said rotary movement being sufficient to cause the gases to move radially by centrifugal action, a more or less perfect separation of the constituents of the mixture will be effected in accordance with their specific gravities. The circular movement necessary for the development of the centrifugal force may be obtained either by causing the gaseous mixture to pass through an apparatus which turns about an axis and draws in the mixture during its rotary movement, or by causing the gas mixture to flow at sufficient velocity through one or more conduits or channels having one or more convolutions.

The present invention has for its object to provide a centrifugal separator operating in accordance with the theory above set forth and which produces; first, a continuous feed of gas mixture to the machine during its rotation; second, to produce by simple mechanical means a machine that will impart the requisite rotary movement for the development of the necessary centrifugal action for separating the constituent gases of the mixture; third, the separation and classification of the gases in the order of their densities in concentric rings, the expulsion of the gases as soon as they are separated and their separate collections.

In order that the invention may be better understood reference will be had to the accompanying drawings which illustrate an apparatus operating in accordance with the principles above set forth, and embodying my invention.

Figure 1 is a side elevation: Fig. 2 is a front elevation: Fig. 3 is a vertical central section transverse to the axis of rotation: Fig. 4 is a vertical central section through the axis of rotation taken at right angles to Fig. 3 and Fig. 5 is an elevation of the separating drum.

The separator consists essentially of a drum or rotary member $a$ whose periphery comprises preferably, but not necessarily, a sheet metal cylinder $b$ and circular sides $c$ and $c'$, suitably secured to a shaft $d$. The interior of the drum is divided, preferably symmetrically, by spiral partitions $e$, $e'$, $e^2$ which are developed from the shaft $d$ toward and secured to the cylindrical periphery $b$. The sides of these partitions are secured to the sides $c$ and $c'$ of the drum, thereby forming a plurality, in this particular instance three, closed spiral channels symmetrically arranged with respect to the axis of the drum. The shaft $d$ rotates in stationary bearings $f$ and $f'$. Stops or baffles $g$, $g'$, $g^2$ are fixed within the drum $a$ to its periphery $b$ and between the outer ends of successive partitions. Each portion of the cylindrical drum $b$ located between the extremities of the spiral successions has one or more apertures $h$ in front of the baffles $g$, and one or more openings $i$ after said baffles.

At the center of the drum and surrounding the shaft $d$ are hubs provided with symmetrically arranged inlet openings $j$, $j'$, $j^2$ each one of said openings extending into a spiral channel. The rotary drum is mounted within a fixed casing $k$ which is divided transversely of the drum into compartments $l$ and $l'$, which compartments serve for the collections of the gases issuing from the apertures $h$ and $i$. The heavier gases pass through the apertures $h$ and the lighter gases pass through the apertures $i$. The hubs which contain the inlet openings $j$ project laterally beyond the sides of the casing $k$.

The operation of the apparatus is as follows. The shaft $d$ upon being driven carries with it the drum $a$ and the partitions $e$, the whole, rotating as a unit. The partitions $e$ act somewhat in the manner of the blades of a fan, lower the pressure at the center of the drum during the rotation and cause the gases to be drawn in through the openings $j$ and thus causing the gas mixture to simultaneously rotate with the drum and at the same time progress through the spiral channels between the partitions $e$ thereby submitting the gas passing along the spiral channels to centrifugal action, which centrifugal action increases as the gas mixture progresses toward the periphery of the drum. The heavier gases, if the speed be sufficient, are then forced toward the outer walls of the spiral channels and the lighter gases are toward the interior taking up radial positions in accordance with their specific gravity so that the heavier gases will follow the outer walls of the spiral channels and will be the first to reach the periphery of the drum and consequently will be the first to meet the baffles *g* and by these baffles will be directed through the openings *h* while the remainder or lighter gases forming the lighter layer will be nearer the center of the drum and will pass under these baffles and out of the drum through the openings *i* beyond the baffles. The openings *h* discharge into one of the channels of the casing *k* and the openings *i* discharge into the other channel. The channels *l* may be connected by suitable pipes to any suitable collection device as a gasometer or the like. A similar result as regards the separation of the gaseous mixture into its constituent elements can be obtained by employing a fixed drum and producing a difference of pressure between the inlets *j* and the outlets *h* and *i*.

Currents of the gaseous mixture are thus set up through the spiral spaces between the partitions *e* and constrain the mixture to move along a spiral path and this movement will cause the gases to be submitted to centrifugal action sufficiently strong to bring about the separation of the elements of the mixture.

The gases separated by the action of the apparatus as above described can again be submitted to the action of another similar machine in order to cause a more complete separation.

By means of my apparatus various mixtures of oxygen and nitrogen may be separated from the atmosphere. Hydrogen may be separated from carbonic acid, or from its mixture with oxygen or carbon monoxid or carbureted hydrogen and it is also possible to separate carbonic acid from its mixture with oxygen or with carbon monoxid or nitrogen.

The cyanogen, the carbonic acid, the hydrosulfuric acid and the sulfurous vapors which are contained in various gases such as illuminating gas, furnace gas, water gas, Dowsen gas, gases of combustion and even the atmosphere, may be separated therefrom by means of this apparatus. The air in mines may be freed from fire-damp and other noxious gases. Thus for example at a tangential speed of 100 meters per second of the drum *a* there is delivered per centimeter effective length of the drum (not including the thickness of the end walls) from each spiral passage through the ports *h* and *i* about twenty cubic meters per hour. At the peripheral speed of 100 meters per second corresponding to about 9,000 revolutions per minute, when treating air, there is an augmentation in the percentage of oxygen of about nine per cent., *i. e.*, if the normal percentage of oxygen in air be taken as 21% then after separation the percentage of oxygen is 30%.

I claim—

1. In a gas separating machine, a spiral conduit through which the gas mixture is passed to impart centrifugal action thereto, in combination with means to separately discharge the gases moving at different speeds.

2. In a gas separating machine, a spiral conduit through which the gas is passed to impart centrifugal action thereto and having an inlet at the center of the spiral, a closing wall at the outer end of the spiral conduit having ports adjacent the curved walls of the spiral and means to separately collect and carry off the gases issuing from said ports.

3. In a gas separating machine, a spiral separating conduit having an inlet at the center of the spiral, a closing wall at the outer end of the spiral having a port adjacent each of the curved walls of the spiral conduit, means secured to said wall between the ports and directed reversely into the path of the gas to be separated, and means to separately collect and carry off the gases issuing from the ports.

4. In a gas separating machine, a closed drum, spiral partition walls to divide the drum into spiral conduits, inlets at the center of the drum to said conduits, said drum having exhaust ports in its periphery at one end thereof adjacent one wall of each conduit and similar ports at the other end adjacent the other wall of the conduit, and a casing having a partition directed between the two sets of ports.

5. In a gas separator, a rotary drum closed at its ends, spiral partition walls to divide the drum into spiral conduits, inlets at the center of the drum in each end thereof to the respective conduits, the periphery of the drum provided with a port on one side of the center of the drum adjacent one spiral wall of each conduit and on the other side of the center of the drum adjacent the other spiral wall of the conduit and angularly displaced, a plate within each conduit longitudinally of the drum and between the angularly displaced ports, a casing into which the ports discharge and having a partition directed between the sets of ports in the drum, whereby each set will discharge into a separate compartment in said casing.

6. In a gas separating machine, a spiral conduit through which the gas to be separated is moved, having exits at its end peripherally spaced in a circumferential direction, and means between the exits to direct the separated gases therethrough.

7. In a gas separating machine, a closed rotary drum having inlet openings at its center, spiral partition walls therein and discharge ports in the drum adjacent opposite walls and coöperating with means to separately convey the gases centrifugally separated in accordance with their density.

In testimony that I claim the foregoing as my invention, I have signed my name in presence of two subscribing witnesses.

EDOARDO MAZZA.

Witnesses:
   FRANCESCO SINNORIS,
   GOTTARDO C. PIRONI.